(12) United States Patent
Paul

(10) Patent No.: US 10,924,446 B1
(45) Date of Patent: Feb. 16, 2021

(54) DIGITAL STORY REPLY CONTAINER

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/154,697

(22) Filed: Oct. 8, 2018

(51) Int. Cl.
*H04L 12/58* (2006.01)
*H04L 12/18* (2006.01)

(52) U.S. Cl.
CPC .......... *H04L 51/32* (2013.01); *H04L 12/1822* (2013.01); *H04L 51/10* (2013.01)

(58) Field of Classification Search
CPC ..... H04L 51/32; H04L 12/1822; H04L 51/10; H04L 12/1813; H04L 41/026; H04L 41/5093; H04L 51/04; H04L 51/08; H04L 51/16; G06Q 50/01; G06F 3/0482
See application file for complete search history.

(56) References Cited

U.S. PATENT DOCUMENTS

| | | | |
|---|---|---|---|
| 7,810,037 B1 | 10/2010 | Edwards et al. |
| D711,406 S | 8/2014 | Hurd et al. |
| D716,336 S | 10/2014 | Guss et al. |
| 8,973,100 B2 | 3/2015 | Rubinstein et al. |
| D740,833 S | 10/2015 | Bae |
| D743,414 S | 11/2015 | Shunock |
| D760,737 S | 7/2016 | Yoon et al. |
| D760,738 S | 7/2016 | Scalisi et al. |
| D762,698 S | 8/2016 | Na et al. |
| D765,683 S | 9/2016 | Peng |
| D773,516 S | 12/2016 | Sun |
| D778,306 S | 2/2017 | Park et al. |
| D781,311 S | 3/2017 | Rad et al. |
| D781,906 S | 3/2017 | Yu |
| D788,157 S | 5/2017 | Kim et al. |
| D790,578 S | 6/2017 | Hatzikostas |
| D798,895 S | 10/2017 | Kim et al. |
| D803,258 S | 11/2017 | Graham et al. |
| 9,917,804 B2 | 3/2018 | Valdivia et al. |
| D817,351 S | 5/2018 | Nanjappan et al. |
| D819,646 S | 6/2018 | Jow et al. |
| D821,436 S | 6/2018 | Kim et al. |
| D823,319 S | 7/2018 | Adriaensen |
| D823,321 S | 7/2018 | Adriaensen |
| D823,322 S | 7/2018 | Adriaensen |
| D823,323 S | 7/2018 | Adriaensen |

(Continued)

OTHER PUBLICATIONS

Notice of Allowance received for U.S. Appl. No. 16/154,695 dated Jan. 15, 2020, 28 pages.

(Continued)

*Primary Examiner* — Muhammad Raza
(74) *Attorney, Agent, or Firm* — FisherBroyles, LLP

(57) ABSTRACT

Systems and methods for a digital story reply container may include (1) displaying a shared story within a story consumption channel of a social media application running on a viewer's computing device, (2) receiving user input selecting a selectable reply element associated with the shared story, (3) digitally adding the viewer to a private chat room associated with the shared story, and (4) displaying a chat room interface corresponding to the private chat room via a display element of the viewer's computing device. Various other methods, systems, and computer-readable media are also disclosed.

20 Claims, 4 Drawing Sheets

(56) References Cited

U.S. PATENT DOCUMENTS

| | | |
|---|---|---|
| D824,929 S | 8/2018 | Spector |
| D829,225 S | 9/2018 | Gandhi et al. |
| 10,091,318 B2 | 10/2018 | Modi et al. |
| D836,124 S | 12/2018 | Fan |
| D839,887 S | 2/2019 | Kim et al. |
| D841,038 S | 2/2019 | Kwon et al. |
| D847,146 S | 4/2019 | Hilhorst et al. |
| D847,161 S | 4/2019 | Chaudhri et al. |
| D854,025 S | 7/2019 | Rad et al. |
| D857,724 S | 8/2019 | Clediere et al. |
| D861,024 S | 9/2019 | Clediere et al. |
| 10,405,020 B2 | 9/2019 | Bruich et al. |
| D863,333 S | 10/2019 | Westerhold et al. |
| D872,116 S | 1/2020 | Kim et al. |
| D873,839 S | 1/2020 | Yan |
| D874,480 S | 2/2020 | Christie et al. |
| D876,476 S | 2/2020 | Honore et al. |
| D877,163 S | 3/2020 | Tekamp et al. |
| D878,386 S | 3/2020 | Turner et al. |
| D881,903 S | 4/2020 | Lepine et al. |
| D882,622 S | 4/2020 | Farnan et al. |
| 10,617,949 B1 | 4/2020 | Paul |
| 10,623,917 B1 | 4/2020 | Paul |
| 10,650,061 B2 | 5/2020 | Spector et al. |
| D887,423 S | 6/2020 | Lee |
| 10,732,785 B2 | 8/2020 | Suh |
| 2007/0130164 A1 | 6/2007 | Kembel et al. |
| 2010/0325218 A1 | 12/2010 | Castro et al. |
| 2013/0110885 A1 | 5/2013 | Brundrett, III |
| 2013/0219333 A1 | 8/2013 | Palwe et al. |
| 2014/0186004 A1 | 7/2014 | Hamer |
| 2014/0279068 A1 | 9/2014 | Systrom et al. |
| 2015/0058750 A1 | 2/2015 | Chakra et al. |
| 2016/0086019 A1 | 3/2016 | Ganong et al. |
| 2016/0247535 A1 | 8/2016 | Latulipe et al. |
| 2016/0292494 A1 | 10/2016 | Ganong et al. |
| 2016/0364368 A1* | 12/2016 | Chen ................... H04L 51/16 |
| 2017/0007902 A1 | 1/2017 | Cottam et al. |
| 2017/0085599 A1 | 3/2017 | Roche et al. |
| 2017/0085691 A1 | 3/2017 | Kim et al. |
| 2017/0149714 A1 | 5/2017 | Valdivia et al. |
| 2017/0161382 A1* | 6/2017 | Ouimet ................. G11B 27/34 |
| 2018/0025326 A1 | 1/2018 | Park et al. |
| 2018/0041461 A1* | 2/2018 | Kurani .................. H04L 51/32 |
| 2018/0046855 A1 | 2/2018 | Ganong et al. |
| 2018/0181565 A1 | 6/2018 | Spector et al. |
| 2018/0192142 A1 | 7/2018 | Paul |
| 2018/0286097 A1 | 10/2018 | Wang |
| 2018/0332162 A1 | 11/2018 | Schutter et al. |
| 2019/0130498 A1 | 5/2019 | Constantinides |
| 2019/0147017 A1 | 5/2019 | Tran |
| 2019/0166074 A1 | 5/2019 | Voss et al. |
| 2019/0197315 A1 | 6/2019 | Zhang et al. |
| 2019/0227989 A1 | 7/2019 | Keel |
| 2019/0302993 A1 | 10/2019 | Francis |
| 2019/0318031 A1 | 10/2019 | Sim et al. |
| 2019/0362292 A1 | 11/2019 | Miao et al. |
| 2020/0007675 A1 | 1/2020 | Khanukaev |

OTHER PUBLICATIONS

Preinterview First Office Action received for U.S. Appl. No. 16/154,698 dated Nov. 12, 2019, 8 pages.

Notice of Allowance received for U.S. Appl. No. 16/154,698 dated Jan. 23, 2020, 19 pages.

Paul, Debashish, "Graphical User Interface for a Display Screen", U.S. Appl. No. 29/665,928 dated Oct. 8, 2018, 11 pages.

Paul, Debashish, "Feedback Hover Screen", U.S. Appl. No. 29/665,929 dated Oct. 8, 2018, 11 pages.

Ex Parte Quayle Action received for U.S. Appl. No. 29/665,928 dated Jun. 9, 2020, 15 pages.

Notice of Allowance received for U.S. Appl. No. 29/665,928 dated Aug. 17, 2020, 15 pages.

Ex Parte Quayle Action received for U.S. Appl. No. 29/665,929 dated Jun. 8, 2020, 21 pages.

Hameed, Syed, "Minimal comment and file upload box", URL: https://dribbble.com/shots/2712780-Minimal-comment-and-file-upload-box, Oribbble, May 13, 2016, 2 pages, Momanii, Hani, "Android How to Integrate Emojis Keyboard in your App", URL: https://www.androidhive.info/2016/11/android-integrate-emojis-keyboard-app/, androidhive, Jul. 12, 2017, 3 pages.

Southern, Matt, "Instagram Adds Personalized Emoji Shortcuts for Quick Comments", URL: https://www.searchenginejournal.com/instagram-adds-personalized-emoji-shortcuts-for-quick-comments/268803/#close, Search Engine Journal, Sep. 9, 2018, 1 page.

Notice of Allowance received for U.S. Appl. No. 29/665,929 dated Aug. 17, 2020, 14 pages.

Non-Final Office Action received for U.S. Appl. No. 29/665,928 dated Feb. 24, 2020, 25 pages.

Van Wert, Joel, "Tint Mobile", URL: https://dribbble.com/shots/29227 41-Tint-Mobile-Login, Dribbble, Aug. 25, 2016, 2 pages.

Marsico, Lean, "Daily UI challenge #001—Login Page-Sign In", URL: https://dribbble.com/shots/3972288-Daily-U I-challenge-001-Login-Page-Sign-In, Dribbble, Nov. 24, 2017, 2 pages.

Singh, Taranpreet, "Login 2.0", URL: https://dribbble.com/shots/3882472-Login-2-0, Dribbble, Oct. 18, 2017, 2 pages.

Non-Final Office Action received for U.S. Appl. No. 29/665,929 dated Feb. 24, 2020, 20 pages.

Dalton, Kristy, "How to Manage the 3 Types of Negative Comments on Social Media", URL: https://www.govtech.com/govgirl/How-to-Manage-the-3-Types-of-Negative-Comments-on-Social-Media.html, Government Technology, Apr./May 2017, 1 page.

Paul, Debashish, "Collaborative Digital Story System", U.S. Appl. No. 16/796,295 dated Feb. 20, 2020, 58 pages.

* cited by examiner

DIGITAL STORY REPLY CONTAINER

BACKGROUND

Social media applications allow users all over the world to share their thoughts and ideas on various topics by creating digital compositions to post via social media consumption channels (e.g., via a newsfeed and/or a stories channel). Many current platforms allow viewers of such compositions to reply to the compositions. For example, a posted composition may include a reply area underneath the composition with comments from other viewers. However, this traditional configuration may not work well with certain consumption channels. For example, a stories consumption channel may display compositions ephemerally (e.g., in a slideshow format), making it difficult to display a traditional reply area. Furthermore, the organization of traditional commenting systems may be cumbersome and/or difficult for users to follow (e.g., as comments evolve over time). This may be especially true for shared stories, which may include multiple posts and/or multiple authors. The instant disclosure therefore identifies a need for systems and methods for organizing and displaying replies to social media compositions such as shared story compositions.

SUMMARY

As will be described in greater detail below, the instant disclosure describes various systems and methods for creating and maintaining digital story reply containers. In one example, a computer-implemented method may include (1) displaying a shared story within a story consumption channel of a social media application running on a viewer's computing device, (2) receiving user input selecting a selectable reply element associated with the shared story, (3) digitally adding the viewer to a private chat room associated with the shared story, and (4) displaying a chat room interface corresponding to the private chat room via a display element of the viewer's computing device. In one embodiment, the method may further include (4) creating the private chat room in response to receiving the user input.

In some examples, the shared story may include a collection of individual stories composed by different authors. The private chat room may include a variety of different participants. For example, the private chat room may include, as participants of the private chat room, each author of the shared story and each viewer who has replied to the shared story. Alternatively, the private chat room may include, as participants of the private chat room, the viewer and a selected subset of the shared story's authors.

In some examples, the method may also include presenting a chat room selection prompt in response to receiving the user input selecting the reply element. In this example, the chat room selection prompt may allow the user to (1) select to join a limited private chat room in which only the viewer and a subset of the shared story's authors are participants or (2) select to join an inclusive private chat room that includes each author of the shared story and each viewer who has replied to the shared story.

In one embodiment, the method may further include (1) receiving user-generated text submitted to a text box within the private chat room and (2) posting a message from the viewer that includes the user-generated text. In this embodiment, the reply element may be associated with an individual story composition within the shared story and the method may further include posting, alongside the viewer's message, an image copied from the individual story composition.

In one embodiment, a system for implementing the above-described method may include a (1) display module, stored in memory, that displays a shared story within a story consumption channel of a social media application running on a viewer's computing device, (2) a receiving module that receives user input selecting a selectable reply element associated with the shared story, and (3) a private chat module that (i) digitally adds the viewer to a private chat room associated with the shared story and (ii) displays a chat room interface corresponding to the private chat room via a display element of the viewer's computing device. The system may also include a physical processor configured to execute the display module, the receiving module, and the private chat module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) display a shared story within a story consumption channel of a social media application running on the computing device, (2) receive, from a viewer, user input selecting a selectable reply element associated with the shared story, (3) digitally add the viewer to a private chat room associated with the shared story, and (4) display a chat room interface corresponding to the private chat room via a display element of the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
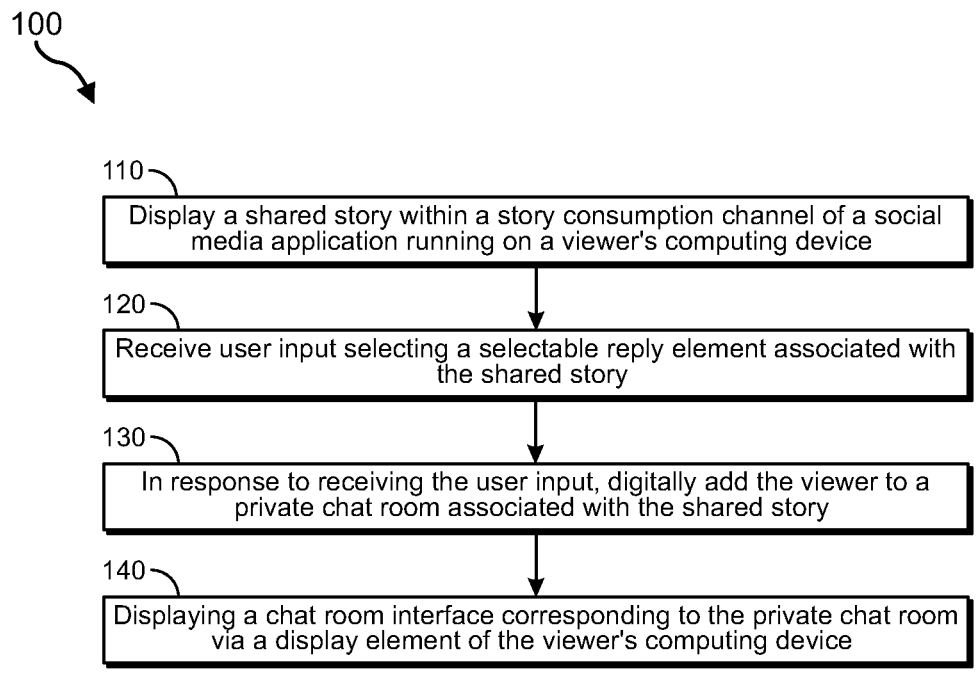
FIG. 1 is a flow diagram of an exemplary method for creating and maintaining a digital story reply container.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a digital story reply container (e.g., that takes the form of a private chat room). In some examples, the reply container may represent a means for replying to a shared story that includes multiple posts by different authors. In these examples, a viewer of the shared story who selects a push button to comment on a post within the shared story may be presented with a prompt allowing the user to select between leaving a comment to an individual author associated with the post or to leave a comment with all of the users associated with the shared story. If the viewer selects to leave a comment with only the individual author, he or she may be navigated to a private chat room with two members: the viewer and the individual author. If the viewer selects to leave a comment with all of the users associated with the shared story, he or she may be navigated to a private chat room with several members: each of the shared story's authors and each viewer who has selected to leave a comment to the shared story.

As will be explained in greater detail below, embodiments of the instant disclosure may provide an easier method for organizing reply comments to stories. This may also improve the functioning of a computer itself by increasing the computer's ability to meaningfully organize data.

The following will provide, with reference to FIG. 1, detailed descriptions of computer-implemented methods for creating and maintaining a digital story reply container. Detailed descriptions of corresponding example systems will also be provided in connection with FIG. 2. In addition, detailed descriptions of a corresponding reply system creation flow will be provided in connection with FIGS. 3-5.

FIG. 1 is a flow diagram of an exemplary computer-implemented method 100 for creating and maintaining a digital story reply container. The steps shown in FIG. 1 may be performed by any suitable computer-executable code and/or computing system, such as the systems described herein. In one embodiment, the steps shown in FIG. 1 may be performed by modules operating within a mobile device. For example, the steps shown in FIG. 1 may be performed by modules operating in a user device 202 (e.g., as shown in exemplary system 200 in FIG. 2).

Figure 2:
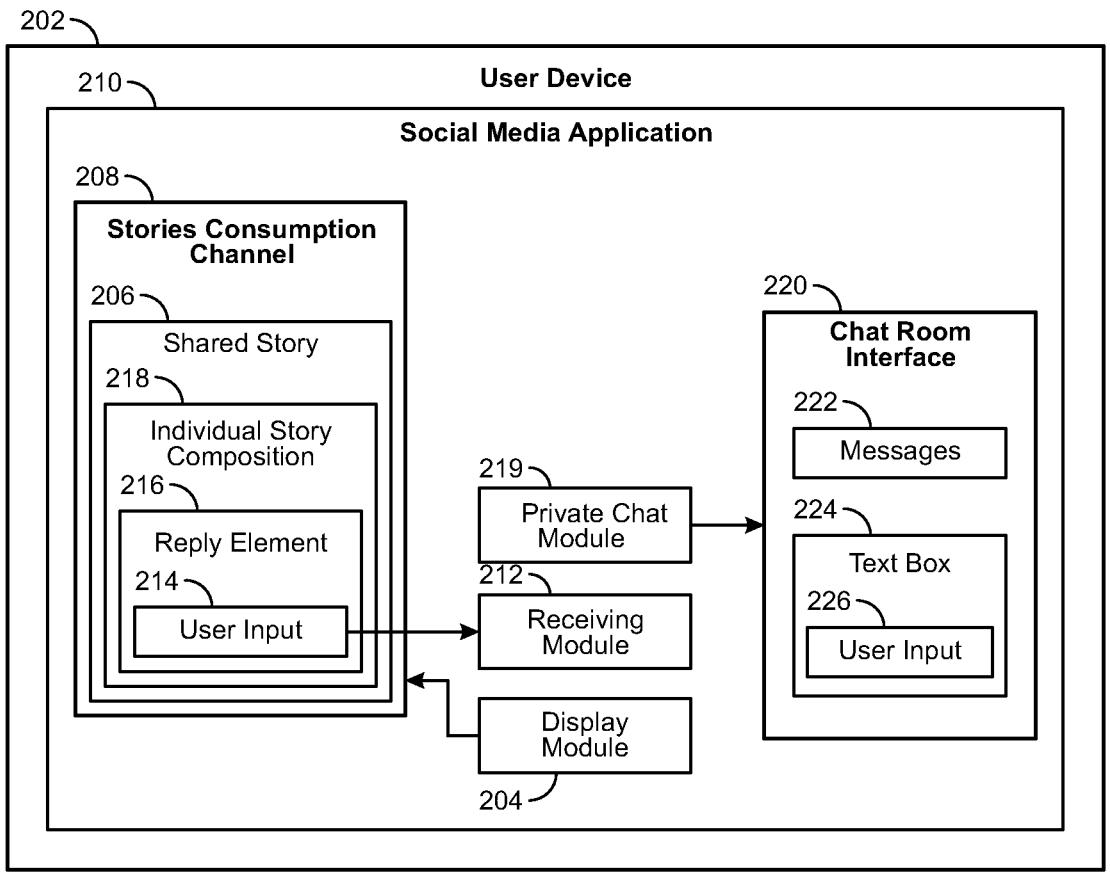
FIG. 2 is a block diagram of an exemplary system for creating and maintaining a digital story reply container.

As illustrated in FIG. 1, at step 110, one or more of the systems described herein may display a shared story within a story consumption channel of a social media application running on a viewer's computing device. For example, as illustrated in FIG. 2, a display module 204 may display a shared story 206 within a stories consumption channel 208 of a social media application 210 running on user device 202.

User device 202 generally represents any type or form of computing device capable of reading computer-executable instructions. For example, user device 202 may represent a user device such as a smart phone and/or a tablet. Additional examples of user device 202 may include, without limitation, laptops, desktops with mobile elements, wearable devices, personal digital assistants (PDAs), etc. In some examples, a user of user device 202 (i.e., a viewer of shared story 206) may have a user account with a social-networking platform and may have an instance of a social media application managed by the social-networking platform and associated with the user's account installed on user device 202 (i.e., social media application 210).

The term "social media application" as used herein refers to any type or form of computer program managed by a social media platform that is installed and executed on a user device to cause the user device to perform useful tasks. In some examples, the social media application may include both a composition functionality and a consumption functionality. The composition functionality may be used to create digital social media compositions to share with other users of the social media platform (e.g., digital newsfeed compositions and/or digital story compositions). The consumption functionality may be used to view user compositions created by other users (e.g., via a newsfeed consumption channel and/or stories consumption channel presented via one or more graphical user interfaces of the social media application).

As used herein, the term "stories consumption channel" generally refers to any type or form of social media consumption channel that presents a continuous series of stories to a viewer, one by one. In one example, the stories consumption channel may transition from presenting one story to the next automatically, without requiring any user input to do so. In some examples, a story may be ephemeral (that is, the story composition may only be viewable for a predetermined amount of time). For example, a story may be set to disappear after twenty-four hours. In addition to presenting stories created by a solo-author, the stories consumption channel may be configured to present shared stories created by a group of authors, as will be discussed in greater detail below.

The term "story" as used herein generally refers to any type or form of social media composition intended for a stories consumption channel. The story may include a variety of content (e.g., a digital photograph, a digital video, a gif, text, a link, etc.). In some examples, a story may include multiple posts, each of which includes different content. In one such example, the story may include a text-based cover card that is displayed for a predetermined amount of time followed by each post, one by one, each of which may be displayed for a subsequent predetermined amount of time.

The term "shared story" as used herein generally refers to a collection of individual stories created by multiple different authors that are stored in the same stories container and associated together within a stories consumption channel. For example, the individual stories within the shared story may be grouped together and displayed as a series within the stories consumption channel. In some examples, a shared story may be organized around an event (e.g., a family vacation, a field trip, a campaign rally, etc.). In additional or alternative examples, a shared story may be organized around a theme (e.g., karaoke compositions of BOLLY-WOOD songs).

Figure 3:
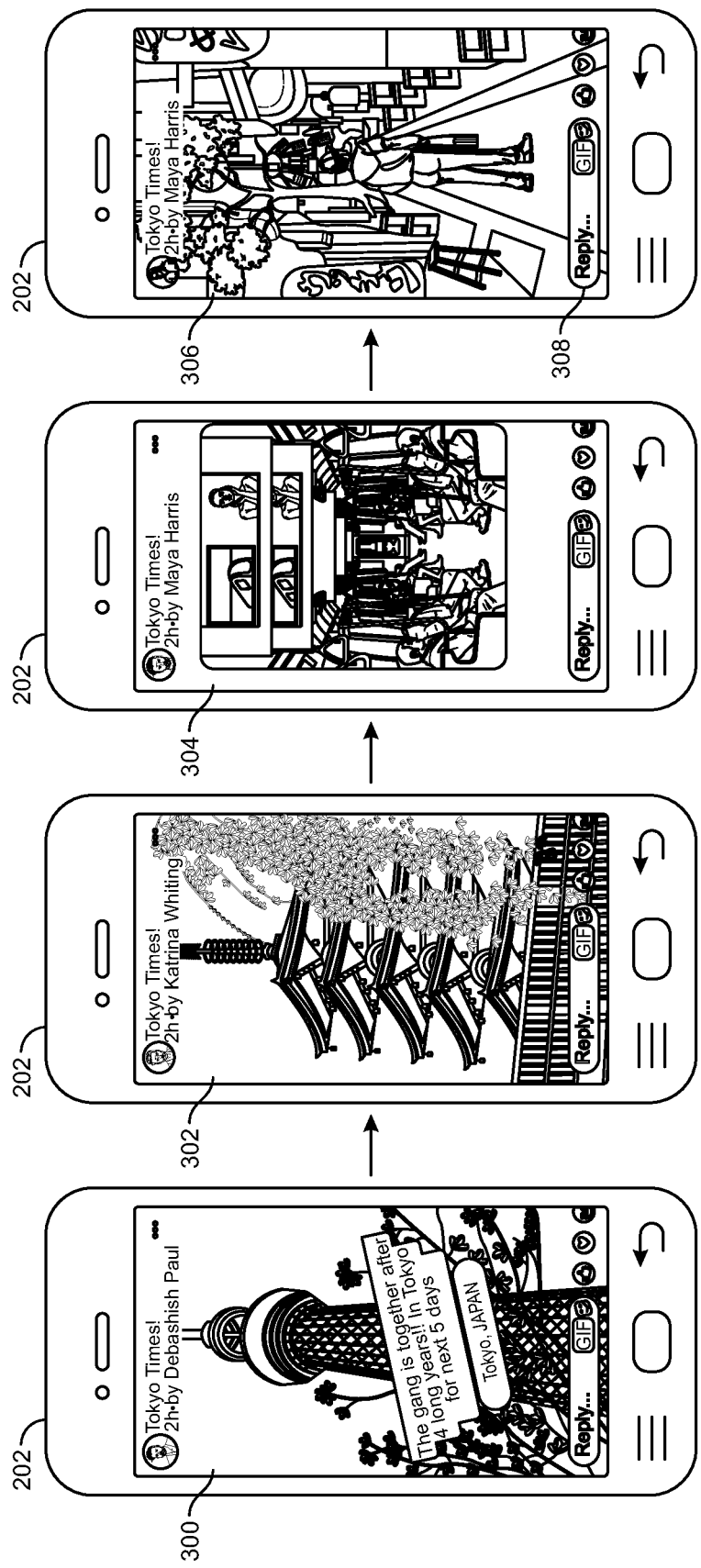
FIG. 3 is an illustration of exemplary story posts within a shared story that utilizes a digital story reply container.

In some examples, the rights to contribute to a shared story may be limited to a group of users invited to contribute to the shared story (e.g., by a producer of the shared story). Additionally, the rights to view a shared story may be limited based on a privacy setting selected by an author to the shared story. FIG. 3 is a specific example of a series of individual stories (i.e., 300, 302, 304, and 306) that together form a shared story (i.e., "Tokyo Times!").

Returning to FIG. 1, at step 120, one or more of the systems described herein may receive user input selecting a selectable reply element associated with the shared story. For example, as illustrated in FIG. 2, receiving module 212 may receive user input 214 selecting a reply element 216 associated with an individual story composition 218 within shared story 206. Using FIG. 3 as a specific example, receiving module 212 may receive user input 214 selecting a reply element 308 within individual story 306.

In some examples, a chat room selection prompt may be presented (e.g., by a presentation module) in response to receiving module 212 receiving user input 214. The chat room selection prompt may allow the viewer (i.e., who submitted user input 214) to select an audience for his or her reply (e.g., by selecting a chat room in which to post a reply). For example, the viewer may select an audience that includes each author of a shared story or an audience that includes only a designated subset of the authors. As another example, the viewer may select an audience that includes other viewers who have replied to the shared story and/or replied to a specific post within the shared story or an audience that excludes such other viewers.

In some examples, the viewer may be given a binary choice. As a first choice, the viewer may post a reply in a limited private chat room that includes only the viewer and the author associated with the post (that is, the individual story composition) to which the viewer is replying (e.g., individual story composition 218 in FIG. 2 and/or individual story 306 in FIG. 3). As a second choice, the viewer may post a reply in an inclusive private chat room that includes each of the authors of shared story 206 and each viewer who has replied to shared story 206.

Figure 4:
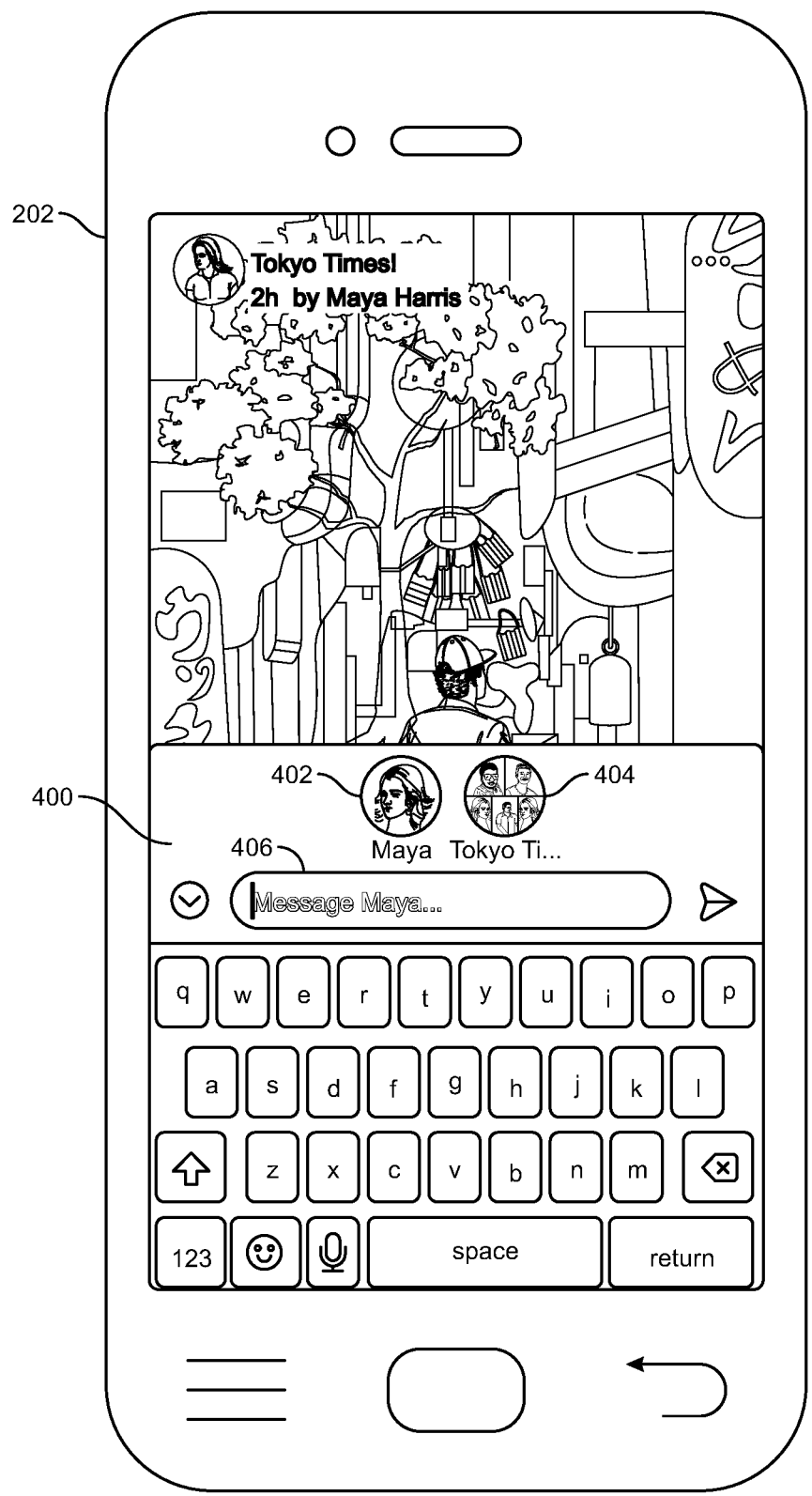
FIG. 4 is an illustration of an exemplary reply prompt displayed in connection with one of the story posts illustrated in FIG. 3.
Figure 5:
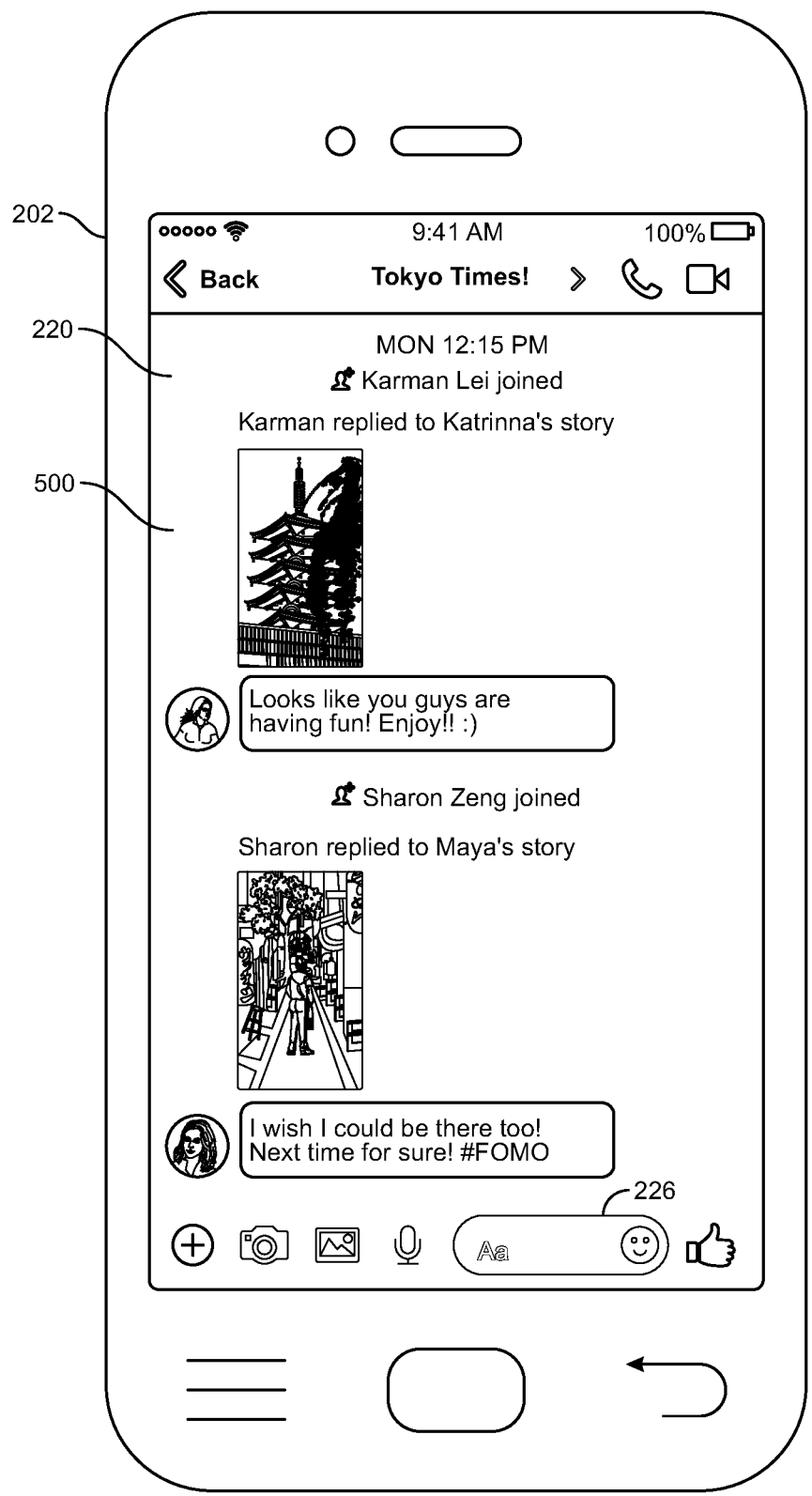
FIG. 5 is an illustration of an exemplary reply container screen.

FIG. 4 is a specific example of a chat room selection prompt 400, presented in response to the viewer selecting reply element 308 in FIG. 3, that provides the viewer with a binary choice. As shown in FIG. 4, chat room selection prompt 400 may allow the viewer to select between the author of individual story 306 (i.e., Maya) by selecting element 402 and the shared story to which the viewer is replying (i.e., Tokyo Times!) by selecting element 404.

In other examples, a chat room selection prompt may provide the viewer with complete control over the audience for his or her reply. For example, the chat room selection prompt may include a list of each author of shared story 206 and may allow the viewer to select each author whom he or she wishes to include. As another example, the chat room selection prompt may include a list of the viewer's contacts and may allow the viewer to select each contact whom he or she wishes to include.

Returning to FIG. 1, at step 130, one or more of the systems described herein may digitally add the viewer to a private chat room associated with the shared story. For example, as illustrated in FIG. 2, a private chat module 219 may digitally add the viewer to a private chat room displayed (e.g., by display module 204) via a chat room interface 220.

In some examples, the viewer may have been the first viewer to submit a reply to the individual story composition 218. In these examples, the private chat module 219 may create the private chat room in response to receiving user input 214. In other examples, the viewer may be added to an existing private chat room.

Private chat module 219 may select a chat room to which to add the viewer to in response to a variety of user inputs. In some examples, private chat module 219 may automatically select a chat room based on receiving module 212 having received user input 226 (i.e., based on a single click of a mouse or tap of a touchscreen). In other examples, private chat module 219 may select a chat room based on input to a chat room selection prompt (e.g., such as chat room selection prompt 400 as discussed above in connection with step 120).

The viewer may be added to a private chat room with a variety of membership inclusions. In some examples, the viewer may be added to a limited private chat room in which only the viewer and a subset of the shared story's authors are participants. For example, the limited private chat room may include only the viewer and an author of an individual story composition to which the viewer is replying. In other examples, the viewer may be added to an inclusive private chat room that includes each author of the shared story and each viewer who has replied to the shared story. For example, a viewer being added to an inclusive private chat room corresponding with the shared story "Tokyo Times!" illustrated in FIG. 3 may include the viewer, each of the authors of "Tokyo Times!" (e.g., Debahish Paul, Katrina Whiting, and Maya Harris), and each of the other viewers who have replied to one of the individual stories within "Tokyo Times!"

Returning to FIG. 1, at step 140 or more of the systems described herein may display a chat room interface corresponding to the private chat room via a display element of the user's computing device. For example, as illustrated in FIG. 2, private chat module 219 may display chat room interface 220 via a display element of user device 202. Using FIG. 5 as a specific example, private chat module 219 may display a chat room interface via a display element 500 of user device 202.

In examples in which the viewer was added to a limited private chat room, private chat module 219 may display a limited private chat room. For example, private chat module 219 may display a chat room with two participants: the viewer and the author of the individual story composition to which the viewer is replying. Using FIG. 4 as a specific example, if the viewer had selected element 402, private chat module 219 may present a limited private chat room with the viewer and Maya as the only participants.

Alternatively, in examples in which the viewer was added to an inclusive private chat room, private chat module 219 may display an inclusive private chat room. For example, private chat module 219 may display a chat room with several participants: each author of the shared story and each viewer who has replied to the shared story. For example, if the viewer had selected element 404 in FIG. 4, private chat module 219 may present the inclusive private chat room depicted in FIG. 5.

Once the private chat room is presented to the viewer, the disclosed method may further include receiving text from the viewer. For example, private chat module 219 may receive user input 226 submitting text to a text box 224 within the private chat room displayed via chat room interface 220. Then, private chat module 219 may post a message created via user input 226. In some examples, private chat module 219 may further post an image associated with individual story composition 218 (i.e., the individual story to which the viewer is replying) alongside the message. Using FIG. 5 as a specific example, private chat module 219 may post the message "I wish I could be there to Next time for sure! #FOMO" underneath an image of individual story 306.

As described throughout the instant disclosure, the disclosed systems and methods may provide a reply system for posting comments to digital stories. In some examples, initiating a reply to a story may automatically place a user into a private chat room. A membership of the private chat room may be limited to just the author of the story being replied to and the user replying to the story. In some examples, the story being replied to may be part of a shared story. In this example, the chat room membership may also be limited to two participants (the author and the replier). Or, the chat room membership may include each author who contributed to the shared story and/or and each user who has replied to the shared story.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive user input and transform the user input into a reply container. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   displaying a shared story, comprising a collection of individual stories composed by a plurality of different contributors, within a stories interface of a story consumption channel provided via a social media application running on a viewer's computing device by ephemerally presenting the individual stories one by one, transitioning from presenting one story to the next automatically, wherein (1) rights to contribute to the shared story are limited to a first group of users invited to contribute to the shared story as contributors and (2) rights to view the shared story are limited to a second group of users indicated by a privacy setting selected by one or more contributors;
   receiving user input, from the viewer of the shared story, selecting a selectable reply element associated with the shared story within the stories interface and, in response to receiving the user input selecting the selectable reply element, providing the viewer with a chat room selection prompt that provides the viewer with a choice to select to join an inclusive private chat room or a limited private chat room, wherein (1) rights to access the inclusive private chat room are limited to a third group of users comprising each viewer who has replied to the shared story and each contributor to the shared story and (2) rights to access the limited private chat room are limited to a fourth group comprising the viewer and a subset of the shared story's contributors;
   receiving an additional user input to the chat room selection prompt selecting to join the inclusive private chat room in lieu of the limited private chat room;

in response to receiving the additional user input, digitally adding the viewer to the inclusive private chat room associated with the shared story;

transitioning from displaying the stories interface to displaying a chat room interface corresponding to the inclusive private chat room;

receiving user-generated text submitted to a text box within the chat room interface; and posting, to the chat room interface, a message from the viewer comprising the user-generated text.

2. The computer-implemented method of claim 1, wherein each of the individual stories of the shared story are stored together in a same story container.

3. The computer-implemented method of claim 1, wherein:

the selectable reply element is associated with an individual story composition within the shared story; and the subset of the shared story's contributors with rights to access the limited private chat room consists of an author of the individual story composition.

4. The computer-implemented method of claim 1, wherein the chat room selection prompt provides the user with a binary choice to select between joining the inclusive private chat and the limited private chat room.

5. The computer-implemented method of claim 1, wherein the chat room selection prompt further provides the viewer with a choice to manually select members for a configurable private chat room in which to post a reply.

6. The computer-implemented method of claim 5, wherein the choice to manually select the members for the configurable private chat room includes a list of each author of the shared stories, enabling the viewer to manually select each author the viewer wishes to include.

7. The computer-implemented method of claim 1, further comprising: creating the inclusive private chat room in response to receiving the user input.

8. The computer-implemented method of claim 1, wherein:

the reply element is associated with an individual story composition within the shared story; and the method further comprises posting, alongside the viewer's message, an image copied from the individual story composition.

9. A system comprising:

a display module, stored in a hardware memory, that displays a shared story, comprising a collection of individual stories composed by a plurality of different contributors, within a stories interface of a story consumption channel provided via a social media application running on a viewer's computing device by ephemerally presenting the individual stories one by one, transitioning from presenting one story to the next automatically, wherein (1) rights to contribute to the shared story are limited to a first group of users invited to contribute to the shared story as contributors and (2) rights to view the shared story are limited to a second group of users indicated by a privacy setting selected by one or more contributors;

a receiving module, stored in the hardware memory, that receives user input selecting a selectable reply element associated with the shared story within the stories interface;

a presentation module, stored in the hardware memory, that in response to the receiving module receiving the user input, from the viewer of the shared story, selecting the selectable reply element:

provides the viewer with a chat room selection prompt that provides the viewer with a choice to select to join an inclusive private chat room or a limited private chat room, wherein (1) rights to access the inclusive private chat room are limited to a third group of users comprising each viewer who has replied to the shared story and each contributor to the shared story and (2) rights to access the limited private chat room are limited to a fourth group comprising the viewer and a subset of the shared story's contributors; and receives an additional user input to the chat room selection prompt selecting to join the inclusive private chat room in lieu of the limited private chat room;

a private chat module, stored in the hardware memory, that:

in response to the presentation module receiving the additional user input, digitally adds the viewer to the inclusive private chat room associated with the shared story;

transitions from displaying the stories interface to displaying a chat room interface corresponding to the inclusive private chat room;

receives user-generated text submitted to a text box within the chat room interface; and posts, to the chat room interface, a message from the viewer comprising the user-generated text; and at least one hardware processor configured to execute the display module, the receiving module, the presentation module, and the private chat module.

10. The system of claim 9, wherein each of the individual stories of the shared story are stored together in a same story container.

11. The system of claim 9, wherein:

the selectable reply element is associated with an individual story composition within the shared story; and the subset of the shared story's contributors with rights to access the limited private chat room consists of an author of the individual story composition.

12. The system of claim 9, wherein chat room selection prompt provides the user with a binary choice to select between joining the inclusive private chat and the limited private chat room.

13. The system of claim 9, wherein the chat room selection prompt further provides the viewer with a choice to manually select members for a configurable private chat room in which to post a reply.

14. The system of claim 13, wherein the choice to manually select the members for the configurable private chat room includes a list of each author of the shared stories, enabling the viewer to manually select each author the viewer wishes to include.

15. The system of claim 9, wherein the private chat module further: creating the inclusive private chat room in response to receiving the user input.

16. The system of claim 9, wherein:

the reply element is associated with an individual story composition within the shared story; and the private chat module posts, alongside the viewer's message, an image copied from the individual story composition.

17. A non-transitory computer-readable medium comprising one or more computer-readable instructions that, when executed by at least one hardware processor of a computing device, cause the computing device to:

display a shared story, comprising a collection of individual stories composed by a plurality of different contributors, within a stories interface of a story consumption channel provided via a social media application running on a viewer's computing device by ephemerally presenting the individual stories one by one, transitioning from presenting one story to the next automatically, wherein (1) rights to contribute to the shared story are limited to a first group of users invited to contribute to the shared story as contributors and (2) rights to view the shared story are limited to a second group of users indicated by a privacy setting selected by one or more contributors;

receive user input, from the viewer of the shared story, selecting a selectable reply element associated with the shared story within the stories interface and, in response to receiving the user input selecting the selectable reply element, provide the viewer with a chat room selection prompt that provides the viewer with a choice to select to join an inclusive private chat room or a limited private chat room, wherein (1) rights to access the inclusive private chat room are limited to a third group of users comprising each viewer who has replied to the shared story and each contributor to the shared story and (2) rights to access the limited private chat room are limited to a fourth group comprising the viewer and a subset of the shared story's contributors;

receive an additional user input to the chat room selection prompt selecting to join the inclusive private chat room in lieu of the limited private chat room;

in response to receiving the additional user input, digitally add the viewer to the inclusive private chat room associated with the shared story;

transition from displaying the stories interface to displaying a chat room interface corresponding to the inclusive private chat room;

receive user-generated text submitted to a text box within the chat room interface; and post, to the chat room interface, a message from the viewer comprising the user-generated text.

18. The non-transitory computer-readable medium of claim 17, wherein each of the individual stories of the shared story are stored together in a same story container.

19. The non-transitory computer-readable medium of claim 18, wherein:

the reply element is associated with an individual story composition within the shared story; and the subset of the shared story contributors with rights to access the limited private chat room consists of an author of the individual story composition.

20. The non-transitory computer-readable medium of claim 17, wherein the chat room selection prompt provides the viewer with a binary choice to select between joining the inclusive private chat and the limited private chat room.

* * * * *